July 14, 1970  H. L. DOBRIKIN  3,520,315
VALVE HOUSING WITH ALTERNATE BRACKET ENTRY
Filed Oct. 5, 1967
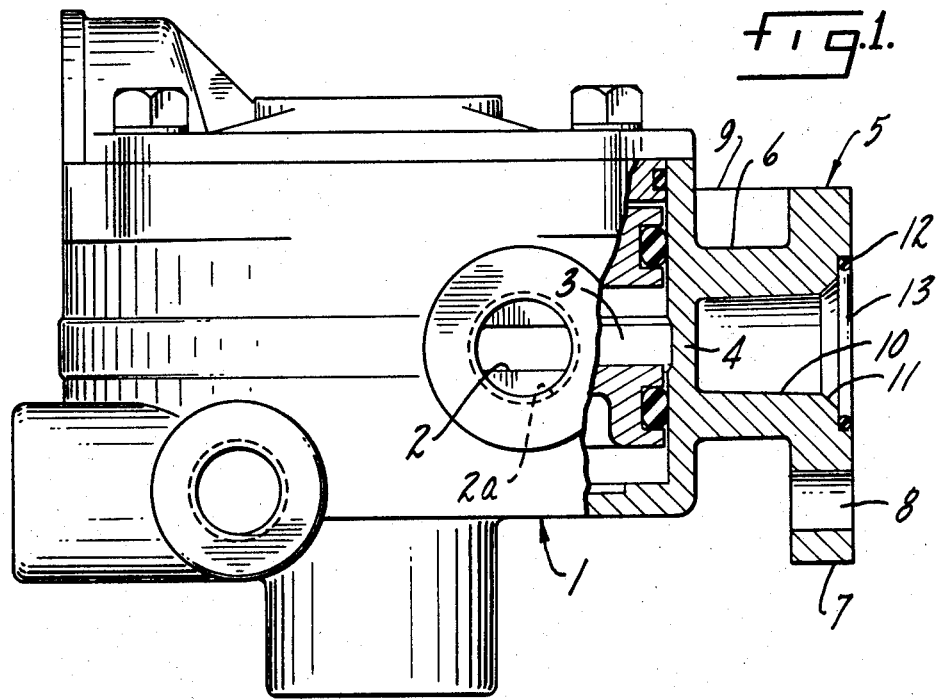
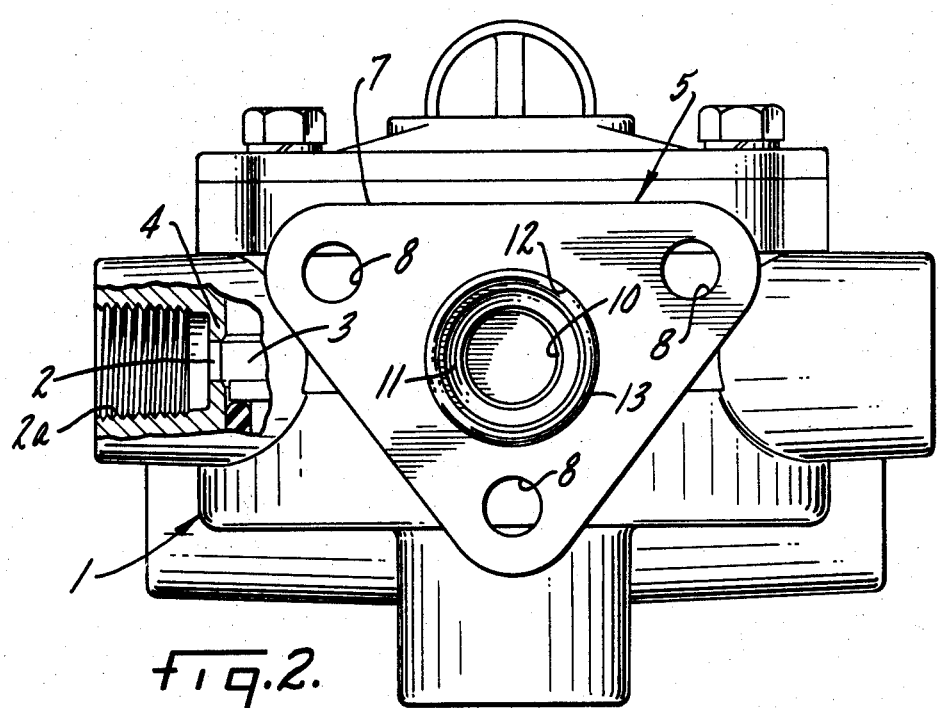
INVENTOR.
Harold L. Dobrikin,
BY Parker & Carter
Attorneys.

3,520,315
VALVE HOUSING WITH ALTERNATE BRACKET ENTRY
Harold L. Dobrikin, Highland Park, Ill., assignor to Berg Mfg. & Sales Co., Des Plaines, Ill., a corporation of Illinois
Filed Oct. 5, 1967, Ser. No. 673,213
Int. Cl. F16k *13/04*
U.S. Cl. 137—68        1 Claim

ABSTRACT OF THE DISCLOSURE

A valve housing with an air chamber therein, a threaded passage into said chamber from outside the housing, a mounting bracket for the housing, a partial passage in the braket and a rupturable wall between the partial passage and the chamber, a seal-receiving recess in the bracket, whereby the bracket may be attached directly to a reservoir without use of conduits, the wall ruptured and the threaded passage plugged or the bracket may be attached remotely from the reservoir, the wall left intact and the threaded passage connected to a conduit from the reservoir.

---

A valve housing having an air chamber designed for communication with a reservoir, a mounting bracket extending from the housing, a passage through the bracket to a rupturable wall of the housing aligned with the chamber, a seal-receiving recess in the bracket, a threaded passage from the chamber to the area external to the housing, whereby the housing may be mounted on the reservoir without the use of conduits or remotely therefrom.

This invention relates to valves and valve housings and has for one of its purposes the provision of a valve housing having alternate fluid pressure inlets.

Another purpose is to provide a valve housing having integral mounting means capable of serving additionally as a fluid pressure inlet.

Another purpose is to provide a valve housing mountable on a source of fluid pressure and including mounting means usable for communication of said housing with said source.

Another purpose is to provide a valve housing alternately applicable to fluid pressure systems with and without inlet piping.

Other purposes may appear from time to time during the course of the specification and claim.

The invention is illustrated more or less diagrammatically in the accompanying drawings, wherein:

FIG. 1 is a side elevation in partial cross section; and
FIG. 2 is an end view in partial cross section.

Like parts are indicated by like numerals throughout the specification and drawings.

Referring now to the drawings, numeral 1 generally designates a valve housing, which may, for example, take the form of the housing disclosed in United States Letters Patent No. 3,022,118, entitled "Relay Valve," issued Feb. 20, 1962. An inlet fitting 2 is provided for delivery of fluid pressure to a chamber 3 within housing 1. The inlet fitting 2 penetrates a relatively thin, circumferential wall 4 of housing 1 for direct communication with chamber 3.

A mounting bracket 5 is formed integrally with the wall 4 and extends laterally therefrom. The bracket 5 includes a substantially circumferential portion 6 and an external annular flange 7 which may conveniently take a triangular planar configuration. A plurality of apertures 8 are formed in the flange 7 for penetration of appropriate fastener elements (not shown). A web 9 may extend from an upper portion of flange 7 to the wall 4, integrally therewith for strengthening.

A bore 10 is formed in circumferential portion 6 of bracket 5 and is closed at its inner or bottom end by the housing wall 4. The opposite end of bore 10 is outwardly flared as indicated at 11. The flared or conical portion 11 joins an annular enlarger recess 12 at the external face of flange 7. A seal 13 is provided for seating within recess 12.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

The use and operation of the invention are as follows:

The bracket 5 provides for mounting of the housing 1 upon any suitable support. The bracket 5 may be secured by suitable fasteners extending through apertures 8 to a reservoir or other source of fluid supply or to any appropriate supporting structure, the wall 4 remaining in contact as shown in FIG. 2.

In such event the source of fluid pressure is communicated by appropriate conduit or piping with the inlet fitting 2. As shown, the fitting 2 includes internal threading for reception of such conduit or piping.

Alternately a suitable plug (not shown) may be threaded into inlet fitting 2 to close the same and the thin wall portion 4 at the base of well 10 in bracket 5 may be pierced or removed to communicate the bore 10 with the chamber 3. In such event the bracket 5 may be secured by suitable fasteners through apertures 8 directly to a reservoir or tank supplying fluid pressure. In such event the seal 13 engages the reservoir or tank portion to which the flange 7 is secured to seal the bore 10 and chamber 3 against communication with atmosphere and fluid pressure is thereupon deliverable directly from the tank or reservoir through bore 10 to chamber 3 and the piping or conduit required in the instance above described may be dispensed with.

I claim:

1. A valve housing, an air chamber in said housing, a first passage communicating with said chamber and extending through a wall of said housing, a mounting bracket formed integrally with an extending from a wall of said housing, a second passage in said bracket, said second passage having one of its ends open to the area externally of said bracket, the other end of said second passage being closed by a portion of said last-named wall between said other end and said chamber, said wall portion being of reduced thickness with respect to the remainder of said last-named wall, and including radially extending portions on said bracket and fastener-receiving conformations in said extending portions, said fastener-receiving portions being circumferentially spaced about said one end of said second passage.

References Cited

UNITED STATES PATENTS

| | | | |
|---|---|---|---|
| 3,027,903 | 4/1962 | Thorp | 137—68 |
| 1,674,427 | 6/1928 | Freygang | 222—5 |
| 2,419,826 | 4/1947 | Dodelin | 222—5 X |
| 3,044,479 | 7/1962 | Meyer. | |

FOREIGN PATENTS

| | | |
|---|---|---|
| 1,005,866 | 4/1957 | Germany. |

WILLIAM F. O'DEA, Primary Examiner

R. GERARD, Assistant Examiner

U.S. Cl. X.R.

137—269; 285—3; 251—143